Figure 3:
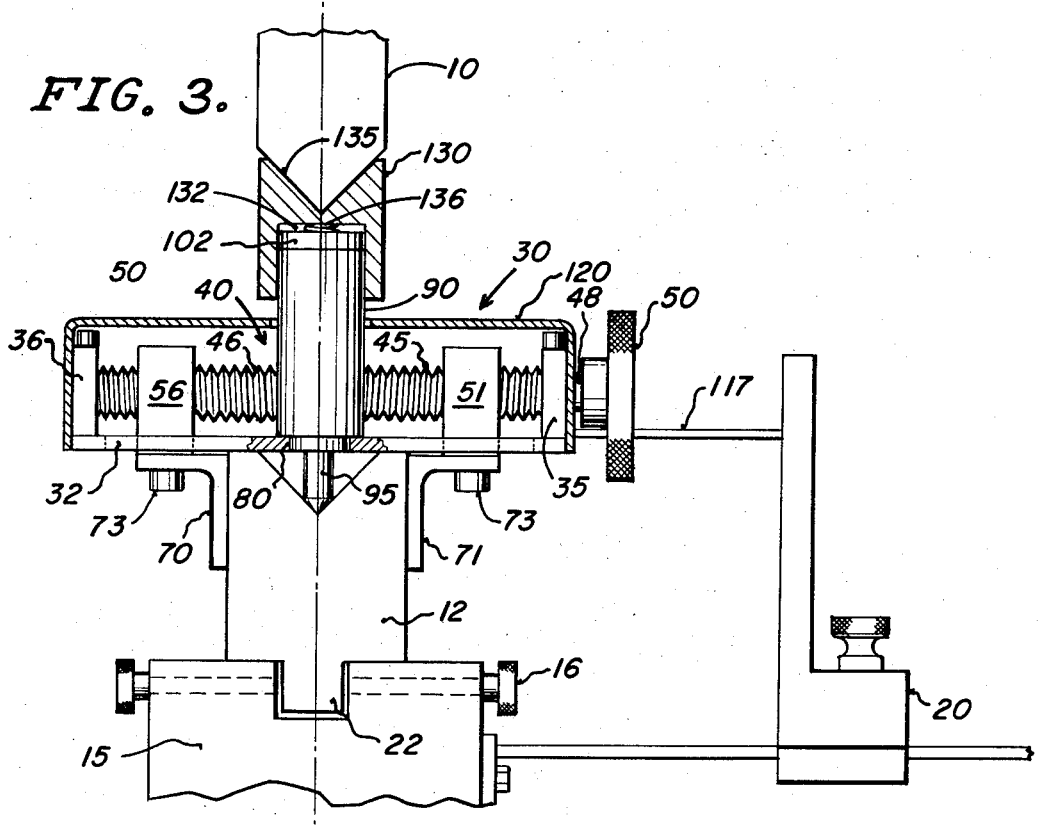

United States Patent

Kelleher

[15] 3,702,502
[45] Nov. 14, 1972

[54] PRESS BRAKE GAUGE
[72] Inventor: Thomas E. Kelleher, 1361 Regan Road, New Lenox, Ill. 60451
[22] Filed: April 20, 1971
[21] Appl. No.: 135,621

[52] U.S. Cl. .................33/185 R, 33/169 C, 33/191
[51] Int. Cl. .................................................B27g 23/00
[58] Field of Search.....33/185 R, 191, 181 R, 169 C, 33/172 D

[56] References Cited

UNITED STATES PATENTS

| | | | |
|---|---|---|---|
| 2,684,538 | 7/1954 | Noe | 33/185 R |
| 2,921,377 | 1/1960 | Hohl | 33/185 R X |
| 3,026,624 | 3/1962 | Clay | 33/191 |
| 3,452,441 | 7/1969 | Baker | 33/185 R |

Primary Examiner—William D. Martin, Jr.
Attorney—Schroeder, Siegfried, Ryan & Vidas

[57] ABSTRACT

A press brake gauge adapted to locate the center of a female die element to insure alignment between male and female die elements to enable accurate measurements to a backstop of a press brake from either the male or female die element. The gauge incorporates a flat base with a pair of downwardly projecting flange members which are adjustably positioned in the base equidistant from a reference point which is shiftable relative to a line which passes through a pair of depending slidably pin elements having feeler tips. The gauge is adapted to fit on the top of a die element to locate the center of the female die and through adjustment of the flanges to enable the flanges to engage the sides of the die for an accurate reference. The gauge includes an adjustable scale which is mounted thereon and referenced to an indicia directed through the center of the slidable pins. A cooperating die element is positioned on top of the base and is adapted to cooperate with the male die element of a press brake. The apex of the notch in the male adaptor on top of the gauge is aligned with the slidable pins to insure alignment between male and female die elements of the press brake.

10 Claims, 4 Drawing Figures

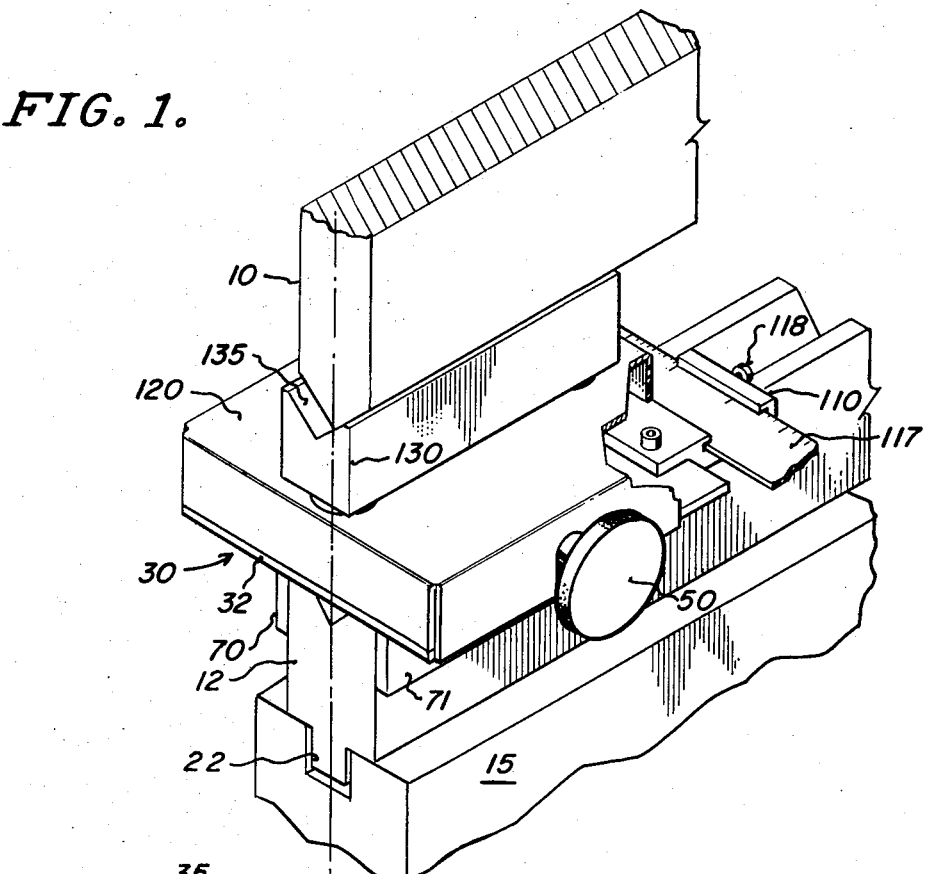
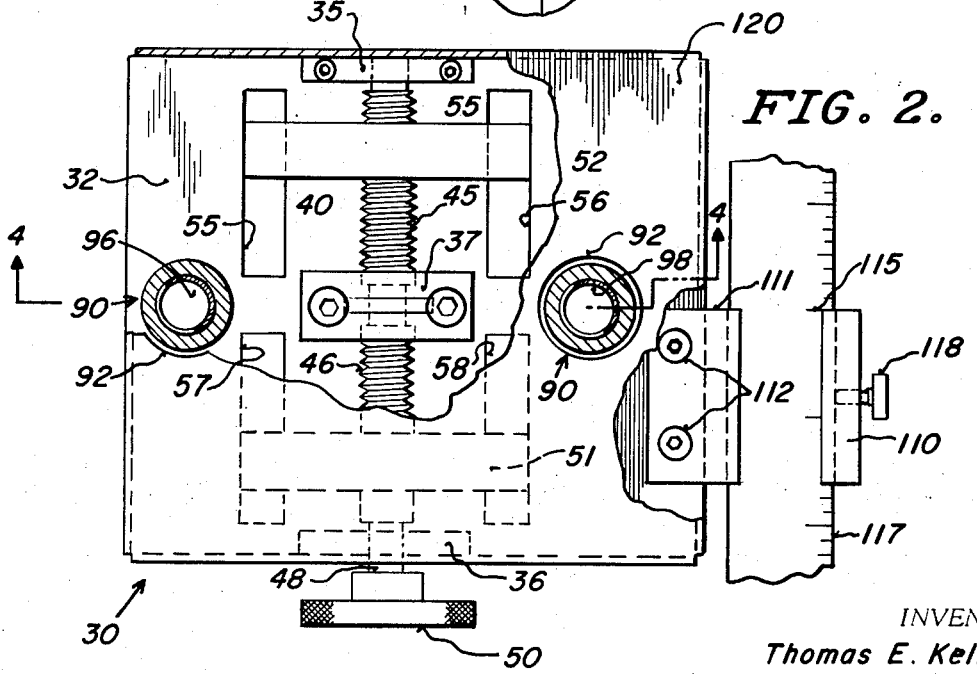

INVENTOR.
Thomas E. Kelleher

PRESS BRAKE GAUGE

My invention relates to a press brake gauge and more particularly to an improved gauge of this type designed to gauge alignment between pairs of die elements to effect location of the center of the female die and alignment with the male die element for such a press to facilitate setting of the backstop.

Press brakes as used in the sheet metal industry are designed to form angle bends or flanges in metal sheets and parts. They employ cooperating die elements, normally a male and female die portion of which the female is a generally stationary installed die element mounted in the bed of the press brake with the male V die element mounted on the reciprocating head of the press brake for movement toward and away from the female die to bend the metal therebetween. The particular length of the dies and physical size of the same may vary and in the set up of such machinery, it is necessary that the die elements be in alignment for accuracy in bending and minimizing wear on the die elements. In addition, a backstop for the metal to be bent is utilized to accurately position the piece of metal being worked over the die so that the proper dimensions from the bend or the flange portion of the parts being worked can be maintained. Thus, in the set up and operation of press brakes, it is essential that either the male or female portion of the die being accurately positioned in the bed or head of the press and the dimension or spacing from the same to a back gauge be accurately determined for accuracy in bending. In addition, the male portion of the die element carried by the head of the press must be in alignment with the notch or V in the female element for proper bending and die wear.

In the past, various types of gauging structures have been employed for measuring the distance from the female die element to the backstop and for adjusting the same. Other types of gauges were used for checking alignment between the die elements. Depending upon the length of the dies and the accuracy of location of the same, set up of a press brake of this type was time consuming, required the efforts of more than one operator and normally involved a cut and try procedure for accurate location of the die elements. Generally, the dies themselves are not accurately machined or located with respect to the center of the block of material which form the same, and consequently, it was difficult to accurately determine the center of the female die element for set up of a machine. Various means have been employed to stabilize supporting structures such that gauges or rules may be relatively rigidly positioned with respect to the dies and accurate dimensions and reading of the same be taken for the set up of the machine. This was particularly true with respect to the backstop which determines the length of material to be positioned over the die with respect to the center of the same.

The improved press brake gauge of the subject invention incorporates a simplified structure for accurately locating the center of a die element irrespective of whether the die surface thereon is accurately located in the block of material forming the same, that is, whether the center of the V is accurately located at the center of the block forming the female die portion or not. The improved press brake gauge includes a reference base structure with adjustable and slidable flanges depending therefrom and slidably mounted pins in the reference base structure which engage the center of the female die. The gauge includes means for adjusting the flanges so that the sides of the same may be brought into contact with the sides of the die to provide with the pins a stable reference from which accurate measurements, through a rule attached to the structure, may be made to a backstop. In addition, the housing or that portion of the gauge housing the slidable pins for the female die also support a die adaptor structure which is generally rectangular in form and having a cooperative V shaped upper surface thereof to permit alignment of the male portion of the die set carried by the press as it is brought into proximity with the female portion to provide for a reference in backstop measurement.

It is therefore the principal object of this invention to provide an improved press brake gauge.

Another object of this invention is to provide in an improved press brake gauge, an accurate method of aligning or locating the center of the female die.

A further object of this invention is to provide a simplified structure for locating a back gauge in a press brake.

Another object of this invention is to provide a simplified press brake gauge which accurately aligns the center of a female die portion or the male portion of a die with a calibrating rule so that measurements may be made therefrom.

A further object of this invention is to provide in a press brake gauge of this type a secondary gauge element which permits alignment of the male and female portions of a press brake.

A still further object of this invention is to provide in a gauge of this type a simplified structure which is extremely accurate in measurement and easy to use.

Figure 4:
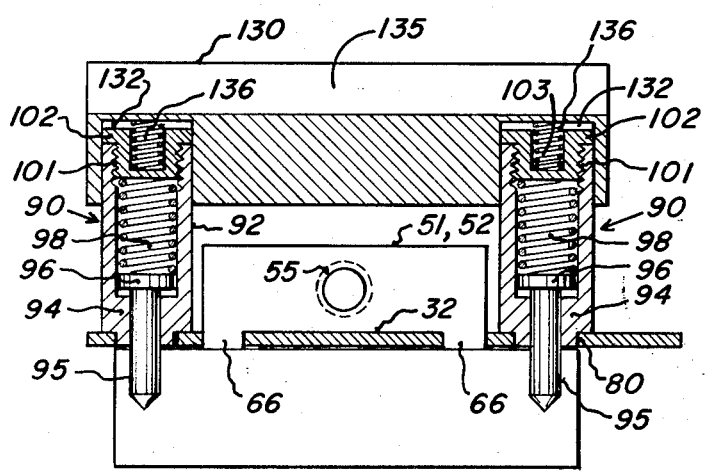

These and other objects of this invention will become apparent from a reading of the attached description together with the drawings wherein:

FIG. 1 is a perspective elevation view of the press brake gauge showing portions of the press brake die elements in section to show the relationship of parts, FIG. 2 is a side elevation view of the press brake gauge of FIG. 1 with parts broken away and showing schematically a backstop for a press, FIG. 3 is a plan view of the press brake gauge of FIG. 1 with parts broken away, and FIG. 4 is a sectional view of the press brake gauge of FIG. 2 taken along the lines 4—4 therein.

My improved press braking gauge, is shown in the drawings in connection with normal V shaped press brake dies. Thus, in FIG. 1, a male V shaped die 10 which is normally mounted in the head of the press (not shown) cooperates with a female V shaped die element 12 which is normally mounted in the base or platform portion of the press indicated generally at 15. This die is adjustably positioned therein such that it may be moved relative to the male die for alignment purposes as indicated by the screws 16. In the operation of presses of this type, the actual angle of the V shaped die portions may vary and the length of the die may vary as well as the width dimensions of the same. For the purpose of operating the press in the bending or forming of angle flanges in sheet type metal, the male and female elements are aligned to mate with one another with the sheet metal to be bent positioned therebetween. The sheet metal is positioned over the female die and extends outwardly beyond the same to contact adjustable backstops, indicated generally at 20, which backstops are located from the center of the female die element and hence the male die element outwardly such that the bent flange or portion of the metal bent by operation of the press will be of proper dimension or width. In the bending of metal, the actual shape or angle of the die as well as the thickness of material will dictate certain allowance factors, which are well known in the industry, and which will be included in the measurement between the center of the male or female portion of the die and the adjustable backstop to properly determine or obtain the correct dimension of material in the flange for a predetermined bending operation.

In the construction of the dies, the location of the V shaped notches, irrespective of the angles thereof or the depths of the same is not always accurate with respect to the general rectangular configuration of the body of the die or the depending flange portion 22 which is used to secure the die element in the appropriate part of the press in which it is mounted. Thus, in the set up of press brakes, and in particular with respect to the location of the backstops, measurement cannot be taken from the side of the die, with accuracy, based on the assumption that the apex or center of the die surface will be in the center of the block of metal forming the die. Thus, such measurements are normally determined by sight and trial and error type processes which are time consuming in the set up of a press brake for bending operations. In addition, alignment of the male and female portions of the die is necessary to eliminate wear between parts as well as to define an accurate bend line.

My improved press brake gauge is shown in the drawings generally at 30. It includes a base plate 32 which is generally rectangular in form. The base plate is formed of metal which is machined or otherwise formed to high dimensional tolerance for flatness to provide a reference surface, as will be hereinafter identified. Mounted on the upper surface of the base plate are a plurality of bearing support flanges 35, 36 and 37 which flanges are located at the edges of the base plate and in the center thereof. These mount a screw member, indicated generally at 40, for the purpose of journaling the same and positioning the screw member to the top side of the base plate. The screw member has oppositely pitched threads 45, 46 thereon and an extension of the screw member of shaft 48 mounts an adjusting knob 50. The journal flanges 35, 36 and 37 are secured to the base plate to journal the shaft for rotation therein and mount the screw member 40 for axial sliding movement through a distance of approximately one-sixteenth inch to either side of a portion of alignment of the center of the screw member with the center of the flanges 37 on the base member by machining of the journaling surfaces of the screw member to allow for axial clearance of at least one-sixteenth inch between the edge of journaling portions of the screw member and the edges of the mounting flanges 35, 36, 37. The base plate includes a plurality of slots 55, 56, 57 and 58 therethrough which are positioned to either side of the screw portions or threaded portions of the screw member 40 and each side of a center line through the base plate and the center journal member 37. Mounted on the screw member 40 are a pair of flange members 50, 51 each of which are generally rectangular in form having a centrally disposed tapped aperture such as is indicated at 55, therein and with downwardly extending flange portions 56 which fit into the slots 55, 56, or 57, 58, respectively. The depending flange portions 66 extend through the slots and mount L shaped flange members 70, 71, respectively on the underside of the base plate 30. The flange members 70, 71 are connected to the flange members 50, 51, respectively, by means of screws indicated at 73. These are positioned on the screw member 40 and on the oppositely pitched surfaces 45, 46 thereof, and with the internal threading of the apertures 55 therein being such that the flange members will move toward one another or away from one another with contrarotation of the screw 40. These are equidistant spaced from a center screw member 40. The central journal member 37 aligns with a pair of apertures 80 positioned through the base plate on either side of the screw 40 and near the edges thereof. Thus, the flange members 70, 71 will be adjustably positioned on the underside of the base plate 32 and will be maintained parallel to one another for all positions of adjustment being equidistant at all times from the center of the screw member. The screw member is slidably positioned with respect to the center line of the base plate extending through the apertures 80 through a distance of approximately one-eighth inch or approximately one-sixteenth inch to either side of a point of alignment of the center of the screw member between the threaded portions and the center of the journaling flange member 37. As will be hereinafter noted, these flange members 70, 71 will positively engage the side of a female portion 12 of the die as the base plate is positioned on the top side thereof even though the center of the die is not centered with the sides thereof.

Positioned through the apertures 80 in the base plate are pin mounting assemblies, indicated generally at 90. These are formed by a generally cylindrical member 92 having a reduced guide extremity 94 at one end thereof with a shoulder portion 95 surrounding the same adapted to fit into the apertures 80 in the base plate. Positioned in the cylinders are pin members 95 having a cylindrical head 96 and a conical or other shaped tip 97 with the body of the pin being machined to slidably move in the guide extremity and with the headed portion being guided by the inner walls of the cylindrical member 92. A conical compression spring 98 is positioned above the cylindrical head and bears against the same. The opposite extremity of the cylindrical member has an internal tap as at 101 and a suitable tapped cylindrical member or spring retainer 102 is threaded therein to bear against the opposite end of the spring. As will be hereinafter noted, this cap has a recess 103 in the upper surface of the same, for purposes to be later noted. The center of the cylindrical member 92 as well as the center of the geometrical center of the pins 95 align with the conical tip 96 on the pins and these are disposed concentric with the apertures 80 to fall in the same plane with the line connecting the geometrical centers of the apertures 80 or the center of the base plate. Where the dies being used do not have V shaped centers, but rather have a curved surface a same known radius, then substitute pins may be inserted into the pin mounting assembly which have tips conforming to the center of the die so that the center of the die lies in the axial center line of the pins.

Also attached to the upper surface of the base plate is a rectangular rule mounting flange 110 which is fixed to the base plate so that one edge of the same, as indicated at 111, will be the index or reference point and will align or fall in a line passing through the geometric centers of the apertures 80 to be aligned with the centers of the pins. The rule mounting flange is fixed to the base by means of suitable screws 112 and the same includes a recess or slot 115 by means of which a rule 117 may be positioned therein and slidably mounted in the mounting flange. A suitable locking screw 118 is positioned through one side of the same to clamp the rule in a fixed position. The base plate 32 mounts a rectangular cover 120 which is positioned over the adjusting screw 40 and supporting journal members 35, 37 and 38. The cover has apertures therein which fit around the upper portion of the pin mounting assembly 90 and a suitable recess is included in the cover to fit around the portion of the rule mounting flange 110 positioned on the upper surface of the base plate.

The press brake gauge also includes a male die adaptor indicated generally at 130, the latter being a generally rectangular block having a pair of recessed apertures 132 on the undersurface of the same which are spaced apart the distance between the cylindrical members and such that it may be positioned over and snugly fit on the cylinders 92 of the pin mounting assemblies 90. The upper surface of the adaptor has a V shaped or other shaped notch 135 therein or recess adapted to receive the depending surface of a male die 10 normally mounted on the head of the press to align the center of the adaptor to the center of the die. Suitable spring members 136 are positioned in the recesses 103 of the spring retaining caps to bear against the undersurface of the block or die 130 to bias the same and allow for limited movement of the adaptor relative to the pin mounting assemblies fixed to the base plate. The latter are press fitted into the base plate or may be threaded therein with the shoulder portions 94 fitting into the recesses 80. With the adaptor 130 mounted on the pin mounting assemblies, the center or apex 135 of the V shaped notch will be in the plane passing through the centers of the cylinders and the slidably mounted pins in the pin mounting assembly.

In the usage of my improved press brake gauge, the gauge is positioned on top of the female die of the press which is normally positioned in the base of the press with the flat undersurface of the base plate 32 of the gauge mounted on the top of the die and such that the depending pins 95 or the tips 96 thereof will rest in the center of the V or other shapes of the elongated die. This female die is normally initially positioned in the press to be subject for further adjustment upon alignment of the male portion thereof which is carried by the head of the press. With the pins 95 in the center of the V, the flat undersurface of the plate 32 will provide a reference across the top of the same. By rotating the screw 40 through the handle or knob 50, the flange surfaces 70, 71 will be directed toward or away from one another. Through proper direction of rotation, the flange surfaces or portions 70, 71 can be brought into engagement with the sides of the die 12. When the center of the die recess is exactly centered between sides the flange surfaces 70, 71 will contact the sides and will be equidistantly spaced from the center line of the base plate passing through the geometric center of the pins and the edge of the rule mounting flange or index for the rule. However, if the center of the groove is offset from the center of the block forming such offset will normally not be over one-sixteenth inch within standard manufacturing tolerances. Under these conditions the screw member will slide axially in either direction with respect to its journal flanges until the centers of the pins align with the center of die and the flange surfaces clamp to the sides of the die to make a stable reference for the index of the rule which is aligned with the pins and hence the center of the die. The size of the dies, that is the width and depth of the V or other shaped notches will vary and hence the pins are slidably positioned in the cylindrical pin mounting assemblies and against the pressure of the springs such that they fit exactly in the base of the grooves for varying sized and shaped dies. This will accurately locate the center of the female die with rule of the gauge. If this is accurately positioned in the press at this time the distance to the adjustable stop 20 can then be adjusted for the particular weight of metal and the particular press job to be undertaken with the dies.

To effect alignment of the male die with the gauge, a male die adaptor 130 is mounted on the pin mounting assemblies 90 and the head of the press is moved to a pint where the male die element 10 will contact the V or other shaped recess in the upper surface of the adaptor. In the event that any misalignment exists, the female die will be adjusted in the base 15 by movement of the adjusting screws 16 therein to locate the female die 12 such that the recess in the same is brought into alignment with the apex of the V shaped projection in the male die. Under these conditions, the setting of the backstop can be effected from the male die element since it is then aligned with the index for the rule on the base plate. The female die may then be locked into position in the bed of the press to effect permanent alignment of the die element. The adjustment of the backstop for the particular job application is effected by measuring the proper distance from the center line of the gauge which aligns with the pins and the V shaped notch in the male adaptor to the backstop taking into consideration the bend tolerances for die shapes and material used. It should be noted that the male adaptor is slidably mounted on the pin assemblies with a certain amount of lost motion due to the presence of the springs 136 therein which allow for slight movement of the adaptor 130 relative to the base plate 32 to insure that the gauge will not be damaged by bringing the head of the press solidly into contact with the gauge.

The improved press brake gauge permits the use of different sized adaptors and for spacer members positioned above the springs in the recesses therein to adjust for varying lengths of stroke of a press, and for varying widths of die openings. It will provide a simplified gauge by means of which a single operator may adjust the dies in a press to accurately align the dies for operating purposes and for accurately positioning the backstops for proper bending lengths.

In considering this invention it should be remembered that the present disclosure is illustrative only and the scope of the invention should be determined by the appended claims.

What is claimed is:

1. A gauge comprising, a base member having a flat lower surface, a pair of flange members positioned in the base member with elongated parallel flange surfaces extending normal to the flat lower surface of the base member, means in the base member for adjustably positioning the depending flange members toward and away from one another and slidable with respect to said base member with said surfaces being maintained in a parallel relationship, a pair of slidably mounted pins positioned in the base member and extending below said flat lower surface and intermediate the depending elongated flange surfaces of the depending flange members, said pins terminating in tips adapted to fit into the center of a die element with said pins having longitudinal axes lying in a plane parallel to the parallel flange surfaces of the flange members, scale holder means mounted on the base member and having an index means positioned in the plane of the longitudinal axes of the pins, and scale means slidably mounted in the scale holder means, said tips of the slidably mounted pins in the base member being adapted to fit into a center groove of a bending die with the elongated parallel flange surfaces of the depending flange members being adjusted toward and away from one another and axially relative to said pins so as to clamp against the sides of the die and establish a reference position at the center of the die for adjusting backstop means.

2. The gauge of claim 1 in which the slidably mounted pins are spring-biased into a depending position from the lower flat surface of the base member.

3. The gauge of claim 2 in which the slidably mounted pins are interchangeable with pins having different shaped tips to conform to different shaped dies and with the longitudinal centers of the pins lying in a plane passing through the index means of the scale holder means.

4. The gauge of claim 1 and including an elongated block with a groove therein adapted to fit into a cooperating bending die in a press with the block positioned on the base member so that the center of the groove lies in a plane passing through the longitudinal axis of the depending slidably mounted pins in the base member.

5. The gauge of claim 1 in which the slidably mounted pins include a pair of cylindrical pin mounting guide members positioned in said base member with the geometric centers of the guide members lying in the plane of the longitudinal axis of the pins and in which the pins are slidably mounted in the guide members and extend through apertures therein below the flat surface of the base member and including spring means positioned behind said pins to slidably bias the same.

6. The gauge of claim 1 in which the means in the base member for adjustably positioning the depending flange members includes a shaft means journaled in said base member and axially slidable relative thereto over a limited range of movement, said shaft means having oppositely pitched threads thereon fitting through tapped openings in the depending flange members which are oppositely tapped to cause movement of the flange members toward and away from one another with rotation of the shaft means.

7. The gauge of claim 6 and including an adjusting knob mounted on the end of the shaft and outside of the base member.

8. The gauge of claim 7 and including clamp means in the scale holder means for clamping the scale means therein and allowing for adjustable positioning the same in the scale holder means.

9. The gauge of claim 5 and including a rectangular block having a pair of cylindrical recesses therein adapted to fit over the cylindrical mounting guides on the base member and including a die shaped upper surface in the block with the center of the die surface aligned in the plane passing through the longitudinal axis of the pins and the tips thereof.

10. The gauge of claim 9 and including spring means positioned between the cylindrical mounting guides and the elongated block to bias the same and allow for vertical movement of the block relative to the mounting guides.

* * * * *